(12) United States Patent
Shaver et al.

(10) Patent No.: US 11,354,880 B2
(45) Date of Patent: Jun. 7, 2022

(54) OPTICAL SENSOR SYSTEMS

(71) Applicant: 3M INNOVATIVE PROPERTIES COMPANY, St. Paul, MN (US)

(72) Inventors: Jonah Shaver, Saint Paul, MN (US); Susannah C. Clear, Hastings, MN (US); John A. Wheatley, Stillwater, MN (US); Kui Chen-Ho, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 71 days.

(21) Appl. No.: 16/758,769

(22) PCT Filed: Oct. 25, 2018

(86) PCT No.: PCT/IB2018/058352
§ 371 (c)(1),
(2) Date: Apr. 23, 2020

(87) PCT Pub. No.: WO2019/082130
PCT Pub. Date: May 2, 2019

(65) Prior Publication Data
US 2020/0257915 A1 Aug. 13, 2020

Related U.S. Application Data

(60) Provisional application No. 62/578,151, filed on Oct. 27, 2017.

(51) Int. Cl.
*G06V 10/147* (2022.01)
*H04B 10/116* (2013.01)
*H04B 10/61* (2013.01)

(52) U.S. Cl.
CPC ......... *G06V 10/147* (2022.01); *H04B 10/116* (2013.01); *H04B 10/614* (2013.01)

(58) Field of Classification Search
CPC combination set(s) only.
See application file for complete search history.

(56) References Cited

U.S. PATENT DOCUMENTS

| 3,709,580 A | 1/1973 | Fugitt |
| 7,203,481 B2 | 4/2007 | Nakao |

(Continued)

FOREIGN PATENT DOCUMENTS

| DE | 19822422 | 11/1999 |
| DE | 102013005083 | 9/2014 |

(Continued)

OTHER PUBLICATIONS

Polarization Camera, Ricoh, retrieved from the internet, URL <https://www.ricoh.com/technology/tech/051_polarization.html>, [retrieved on Jun. 21, 2020], 4 pages.

(Continued)

*Primary Examiner* — Omar S Ismail
(74) *Attorney, Agent, or Firm* — Clifton F. Richardson; Daniel J. Iden (57) ABSTRACT

Systems, assemblies, and methods for detecting changes in polarization states are described. Example systems may include a light receiving unit including a sensor and a receiving polarizer. The sensor is configured to sense light from a polarized light source deflected through the receiving polarizer by a light directing article. The sensor is configured to generate a signal indicative a received polarization state of light deflected by the light directing articles. Such systems may be coupled to vehicles and may be useful for sensor-detectable signs, indicia, and markings to facilitate automated or assisted vehicular transport.

12 Claims, 8 Drawing Sheets

(56) References Cited

U.S. PATENT DOCUMENTS

| | | |
|---|---|---|
| 7,369,172 B2 | 5/2008 | Fujii |
| 7,806,538 B2 | 10/2010 | Ajiki |
| 8,350,723 B2 | 1/2013 | Serex |
| 8,831,286 B2 | 9/2014 | Li |
| 8,908,038 B2 | 12/2014 | Li |
| 8,988,638 B2 | 3/2015 | Jiang |
| 9,019,607 B2 | 4/2015 | Merrill |
| 9,187,063 B2 | 11/2015 | Hirai |
| 9,317,754 B2 | 4/2016 | Hirai |
| 9,477,029 B2 | 10/2016 | Parker |
| 2001/0012153 A1 | 8/2001 | Halter |
| 2002/0067292 A1 | 6/2002 | Appenrodt |
| 2003/0189839 A1 | 10/2003 | Shikano |
| 2006/0215076 A1 | 9/2006 | Karim |
| 2007/0131851 A1* | 6/2007 | Holtz .................. G06V 10/145 250/225 |
| 2008/0129541 A1 | 6/2008 | Lu |
| 2009/0009668 A1* | 1/2009 | Tan ...................... G02B 5/3016 349/1 |
| 2009/0315993 A1 | 12/2009 | Hirai |
| 2010/0085175 A1 | 4/2010 | Fridthjof |
| 2012/0242835 A1 | 9/2012 | Li |
| 2012/0287037 A1* | 11/2012 | Shikii ................. H04N 13/376 349/15 |
| 2013/0127980 A1* | 5/2013 | Haddick ................ G06F 3/013 348/14.08 |
| 2013/0222676 A1* | 8/2013 | Ono ....................... G03B 17/02 348/345 |
| 2013/0278631 A1* | 10/2013 | Border .................. G06Q 30/02 345/633 |
| 2015/0035980 A1 | 2/2015 | Krokel |
| 2017/0293166 A1* | 10/2017 | Rhême ................. G02F 1/0136 |
| 2018/0139365 A1* | 5/2018 | Kanamori ............ H04N 5/2256 |

FOREIGN PATENT DOCUMENTS

| | | |
|---|---|---|
| DE | 102015209442 | 11/2016 |
| EP | 2397837 | 12/2011 |
| EP | 3229011 | 10/2017 |
| JP | 1063253 | 1/1978 |
| JP | 03118612 | 5/1991 |
| JP | 05340728 | 12/1993 |
| JP | 09083879 | 3/1997 |
| JP | 10332576 | 12/1998 |
| JP | 2000230805 | 8/2000 |
| JP | 2003-099885 | 4/2003 |
| JP | 2008158535 | 7/2008 |
| JP | 2010-121935 | 6/2010 |
| JP | 5850225 | 3/2013 |
| JP | 5853719 | 8/2013 |
| JP | 5899957 | 8/2013 |
| JP | 2014041171 | 3/2014 |
| JP | 6098975 | 9/2014 |
| JP | 2014169965 | 9/2014 |
| JP | 2014222567 | 11/2014 |
| WO | WO 2011-094024 | 8/2011 |
| WO | WO 2011-157319 | 12/2011 |
| WO | WO 2014-118337 | 8/2014 |
| WO | WO 2016-018305 | 2/2016 |
| WO | WO 2018-151761 | 8/2018 |

OTHER PUBLICATIONS

International Search Report for PCT International Application No. PCT/IB2018/058352, dated Feb. 26, 2019, 5 pages.

* cited by examiner

FIG. 12A

OPTICAL SENSOR SYSTEMS

CROSS REFERENCE TO RELATED APPLICATIONS

This application is a national stage filing under 35 U.S.C. 371 of PCT/IB2018/058352, filed Oct. 25, 2018, which claims the benefit of Provisional Application No. 62/578,151, filed Oct. 27, 2017, the disclosure of which is incorporated by reference in their entirety herein.

TECHNICAL FIELD

The disclosure describes optical sensor systems, in particular, optical sensor systems for vehicles.

BACKGROUND

Automated driving technology makes use of optical sensor systems to detect roadway objects which can include infrastructure, other vehicles, or pedestrians. Increasing the range of detectability, improving signal to noise, and improving the recognition of objects continue to be fields of development. Systems that can provide at a distance, conspicuity, identification, and data via optical sensor systems, while being substantially visually imperceptible, may be advantageous. For example, signs may serve a dual purpose, where the sign may be visually read in the traditional way, and simultaneously the optical system can sense an invisible code that assists an onboard driving system with automated driving.

Other industry problems regarding optical sensors include the need to improve detection in adverse conditions that may affect light path and quality, which can cause signal to noise problems for the detection of infrastructure, vehicles, or pedestrians.

SUMMARY

The disclosure describes example systems, methods, and computer program products that may be useful for sensor-detectable signs, indicia, and markings to facilitate automated or assisted automobile transport.

The disclosure describes an example system including a light receiving unit. The light receiving unit includes a sensor and a receiving polarizer. The sensor is configured to sense light from a polarized light source deflected through the receiving polarizer by a light directing article. The sensor is configured to generate a signal indicative of a received polarization state of the light deflected by the light directing article.

The disclosure describes an example technique includes receiving, by a light receiving unit, light from a polarized light source deflected by a light directing article. The example technique includes generating, by the light receiving unit, a signal indicative of a received polarization state of the light deflected by the light directing article. In some examples, a vehicle may perform predetermined vehicle action in response to a response signal ultimately based on the received polarization state of light.

The disclosure describes an example computer readable storage medium comprising instructions that, when executed, cause at least one processor to receive a signal generated by a light receiving unit, wherein the signal is indicative of a received polarization state of light from a polarized light source deflected by a light directing article and received by the light receiving unit. The instructions, when executed, cause the at least one processor to determine the received polarization state of light based on the signal. The instructions, when executed, cause the at least one processor to determine a response signal based on the received polarization state. The response signal is configured to cause a vehicle to perform a predetermined vehicle action in response to the response signal.

The disclosure describes an example assembly including a polarized light source and a light receiving unit. The light receiving unit is configured to generate a signal indicative of a received polarization state of light received by the light receiving article.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

FIGS. 2A to 2D are conceptual and schematic diagrams of example polarized light sources.

It should be understood that features of certain Figures of this disclosure may not necessarily be drawn to scale, and that the Figures present non-exclusive examples of the techniques disclosed herein.

DETAILED DESCRIPTION

The disclosure describes systems and techniques for providing, at a distance, conspicuity, identification, and even data, to semi- or fully-automated vehicles, via optical sensor systems. Systems and techniques according to the disclosure utilize variations in polarization states or changes in optical characteristics (for example, intensity) of light having predetermined polarization states. Such variations or states of polarization may not be visibly perceptible, providing a number of advantages. For example, a road or traffic sign may serve dual purposes, where the sign can be visually inspected or read in a traditional manner, and simultaneously also provide a visually imperceptible, but machine-readable, signal, code, or pattern, that may be detected by an onboard controller or driving system.

Systems and techniques according to the disclosure may also allow detection of information conveyed by signs, patterns, or markings, at relatively large distances that may deter optical resolution or recognition of patterns or codes, but yet be sufficiently small to transmit polarization states or variations thereof. For example, vehicle safety may be increased by providing information to an onboard controller much earlier and further away from an object before the object can be visually inspected. Providing such early notification to the controller may allow the controller to cause a vehicle to take a predetermined vehicle or navigation action, or to alert a, occupant of the vehicle, for example, a driver.

Systems and techniques according to the disclosure may further address problems such as improving detection of signs, markings, and objects in adverse conditions such as day or nighttime glare, haze, or foggy or smoggy conditions, which can attenuate signal to noise content, making it difficult to detect objects, infrastructure, vehicles, or pedestrians, whether by visual inspection or by machine sensing.

Using polarization states and variations thereof that may not be visually perceptible or otherwise amenable to manual manipulation may also deter spoofing, hacking, or other disruptions of vehicle operation or vehicle infrastructure. For example, polarization states and their variations may act as invisible security or steganographic features that may promote vehicle safety.

Example systems and techniques described herein may be useful in machine vision detection and sensing systems. As one example, as transportation infrastructure becomes more complicated, vehicles are gaining more driving autonomy. In order to navigate safely and effectively, sensing modules are increasingly incorporated into these vehicles to performs tasks such as parking assistance, self-regulating cruise control, and lane deviation warning, or even semi- or fully-autonomous navigation and driving, including collision avoidance and traffic sign interpretation. In order to sense the environment around them, vehicles may use light-based sensor systems. For example, a lidar (light radar) system may use a constellation of points of light that move through the environment in order to detect potential obstacles or informational objects and traffic events.

In some examples, a light receiving unit includes a sensor and a receiving polarizer. The sensor is configured to sense light from a polarized light source deflected through the receiving polarizer by a light directing article. The sensor is configured to generate a signal indicative of a received polarization state of the light deflected by the light directing article.

The light directing article may be configured to preserve, filter, enhance, or transform one or more polarization components of incident light. In some examples, one or more of the polarized light source, light directing object, or light receiving unit may include spatially variant polarization modifying features. Such polarization modifying features may generate spatial or temporal patterns, for example, spatial or temporal variations in polarization state or intensity of particular polarizations. Such patterns may be detected as machine-readable information in the visible or near infrared spectrum, while having a low, reduced, or negligible visible perception. For example, a light directing article including spatially variant polarization properties can modify the polarization state of incident light so that a pattern or code can be detected by the light receiving unit. While spatial variance may be useful in some examples, in other examples, spatial variation may not be utilized. For example, the light directing article may include a retroreflector that is dissimilar from surrounding materials, thus returning to the light receiving unit a different signal than other light directing articles or objects in the field of view, without itself being spatially variant.

In some examples, no polarizer is present on or adjacent the light directing article, but instead is on or adjacent the light source and or light receiving unit. Such an arrangement preserves high efficiency of light deflection by the light directing article and may maintain invisibility of patterns to visual perception, yet being detectable by a machine vision system.

Thus, example systems and methods for detecting polarization states of received light are described. Such systems may be coupled to vehicles, and cause or control the vehicle to performed predetermined vehicle actions in response to the detected polarization states and spatial variations in polarization patterns. The vehicles may include automobiles, cars, trucks, buses, trains, automated vehicles, marine vehicles, construction equipment, warehouse robots, industrial robots or moving equipment, or drones. Such systems may be useful for sensor-detectable signs, indicia, and markings to facilitate automated or assisted automobile transport.

Figure 1:
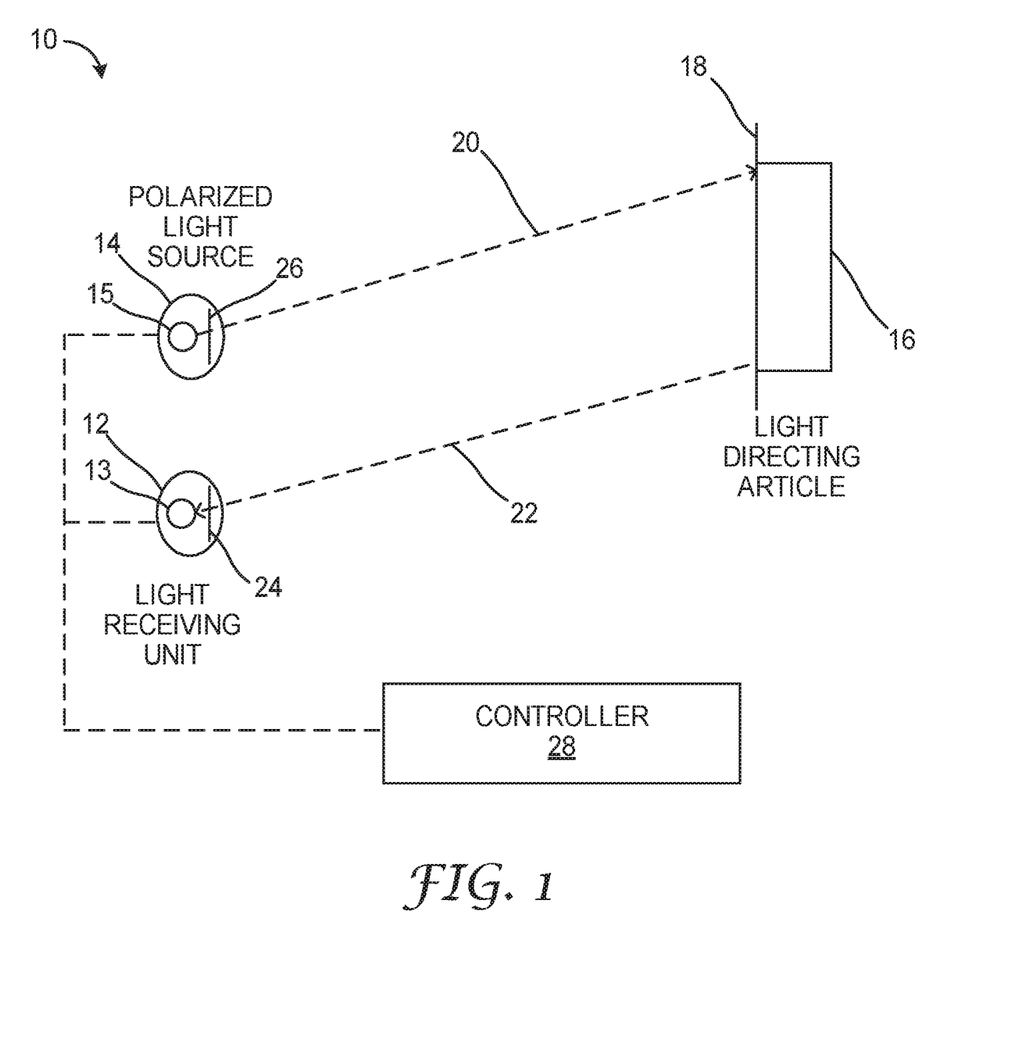
FIG. 1 is a schematic and conceptual view of an example system including a light receiving unit.

FIG. 1 is a schematic and conceptual view of an example system 10 including a light receiving unit 12. Light receiving unit 12 receives light from a polarized light source 14 deflected by a light directing article 16. In some examples, system 10 includes one or both of polarized light source 14 or light directing article 16, in addition to light receiving unit 12. In other examples, one or both of polarized light source 14 or light directing article 16 may be components of different systems, while ultimately interacting with light receiving unit 12 of system 10. Polarized light source 14 may emit visible or nonvisible wavelengths of light having a polarization component towards light directing article 16, for example, incident light 20, and light directing article 16 may interact with incident light 20 to generate deflected light 22 towards light receiving unit 12.

In some examples, light directing article 16 may include a traffic object, for example, a moving or a stationary object. For example, light directing article 16 may include a traffic sign, a navigational sign, a highway or roadway marker, road or street markings, sidewalk markings, a yield sign, a stop sign, a sign marking proximity of an upcoming light signal post or cross-walk, a stop light, fences or barriers, fence or barrier markings, lane markings, a pedestrian, or another vehicle.

Light directing article 16 may include any article capable of deflecting, for example, reflecting, retroreflecting, or scattering, light from polarized light source 12, for example, towards light receiving unit 14. In some examples, as shown in FIG. 1, light directing article 16 includes a retroreflective surface 18. Retroreflective surface 18 may causing incident light 20 originating from polarized light source 14 to be deflected (for example, retroreflected) in substantially the same direction as deflected light 22 towards light receiving unit 12. In other examples, light directing article 16 may reflect or scatter deflected light 22 in a direction different from that along incident light 20. In some examples, system 10 may include one or more articles such as prisms, beamsplitters, mirrors, absorbers, reflectors, diffusers, or optical filters, for changing the direction and optical characteristics of one or both of incident light 20 or deflected light 22. Thus, while both incident light 20 or deflected light 22 are shown as following a substantially linear path in the example illustrated in FIG. 1, in other examples, one or both of incident light 20 or deflected light 22 may travel along paths defining one or more segments along different directions.

In some examples, light directing article 16 includes at least one polarization change feature (not shown) configured to change polarization of light incident on the light directing article into a different polarization state of deflected light. In some examples, the at least one polarization change feature includes a plurality of polarization change features arranged in a predetermined spatial pattern on the light directing article configured to change polarization of incident light into a plurality of predetermined different polarization states of reflected light. Each polarization state of the predetermined different polarization states being associated with a relative location of a polarization change feature of the plurality of polarization change features along light directing article 16. In some examples, light directing article 16 comprises retroreflective article 18. For example, light directing article 16 may include one or more retroreflective articles described in U.S. provisional application Ser. No. 62,461,177 and PCT Application No. PCT/US17/53657, both incorporated herein by reference in their entirety.

Incident light 20 originating from polarized light source 14 may be deflected (for example, scattered, reflected, or retroreflected) by light directing article 16 as deflected light 22. In some examples, light directing article 16 may substantially preserve a polarization of incident light 20, so that deflected light 22 has substantially the same polarization as incident light 20. In other examples, light directing article 16 may interact with incident light 20 to generate deflected light 22 having a different polarization from that of incident light 20. Thus, one or more of incident light 20 or deflected light 22 may include linear polarized (for example, s-polarized or p-polarized) or a circularly polarized (for example, right-circularly polarized or left-circularly polarized) light. One or more optical characteristics such as frequency, wavelength, or polarization state of one or both incident light 20 or deflected light may vary temporarily, for example, in response to movement, obstruction, change in proximity, in response to a control signal, in response to a signal from another vehicle or traffic infrastructure. For example, polarized source 14 may generate incident light 20 in a predetermined temporally variant pattern including temporal or spatial changes in one or more of frequency, wavelength, or polarization state.

Light receiving unit 12 is configured to detect a polarization state of deflected light 22 deflected by light directing article 16 from polarized light source 14. In some examples, light receiving unit 12 includes a sensor 13 and a receiving polarizer 24. Sensor 13 is configured to sense light from polarized light source 14 deflected through receiving polarizer 24 by light directing article 16, as shown in FIG. 1. In some examples, sensor 13 includes a camera, for example, a visible light or infrared camera. In some examples, sensor 13 may include a charge-coupled device (CCD), a complementary metal oxide semiconductor (CMOS) sensor, or any other sensor capable of generating a signal in response to detecting photons of light having a predetermined characteristic (for example, a range of wavelengths or intensities).

Receiving polarizer 24 may substantially only allow light of a predetermined polarization to pass through, for example, a predetermined polarization component of deflected light 22. For example, receiving polarizer 24 may substantially only allow right-circularly polarized light to pass through, so that a linearly polarized component or a left-circularly component of deflected light 22 does not pass through receiving polarizer 24. In such an example, sensor 13 may substantially only receive (and therefore, sense) right-circularly polarized light, and generate a signal indicative of the presence of right-circularly polarized light. Depending on the configuration of receiving polarizer 24, sensor 13 may substantially receive and sense only light of predetermined polarization states. Thus, sensor 13 is configured to generate a signal indicative of a received polarization state of light 22 deflected by light directing article 16. In some examples, sensor 13 includes an array of sensing elements, each sensing element of the array being responsive to predetermined respective polarization states. For example, sensor 13 may detect a spatial variation in polarization states along or across a surface of light directing article.

The signal generated by sensor 13 may be analyzed or processed to determine the received polarization state or polarization pattern of deflected light 22, and an action (for example, a predetermined vehicle action) may be undertaken ultimately based on the polarization state or pattern. The polarization state or pattern may include one or both of spatial or temporal patterns, for example, a barcode or barcode analog, or flashing, blinking, moving, or other continuous or intermittent patterns or variations in patterns with time. The patterns or variations in polarization of deflected light 22 may be responsive to patterns or variations in one or both of polarization modifying features in light directing article 16 or incident light 20 from polarized light source 14.

For example, polarized light source 14 may include one or more source elements 15 that emit visible or nonvisible wavelengths of light. One or more source elements 15 may include a diffuse light source, for example, one or more light emitting diodes (LEDs), incandescent sources, or fluorescent sources. In other examples, one or more source elements 15 may include a collimated source, for example, a laser, or a lidar source. Polarized light source 14 may include a source polarizer 26 that polarizes light emitted by one or more source elements 15 to generate incident light 20 having a predetermined polarization state. In examples in which polarized light source 14 includes an element that inherently emits polarized light, for example, a lidar beam, polarized light source may not include source polarizer 26, or may include source polarizer 26 having a polarizing effect different from the inherent polarization of the polarized beam.

Receiving polarizer 24 or source polarizer 26 may include any suitable polarization element capable of selectively transmitting predetermined polarization components. For example, unpolarized light may include photons oscillating in random planes with respect to the direction of travel of the light wave. A polarization element may selectively allow only photons oscillating in particular planes. For example, a linear polarizer may selectively directionally absorb or block light, so that only waves oscillating in planes that are perpendicular to the absorptive or reflective region of the polarizer may pass through the medium, whereas waves that are oscillating in orthogonal planes are absorbed or blocked by the polarizer. Waves in other planes are passed according to the relative values of the parallel and orthogonal components. A circular polarizer, for example, a quarter-wave retarder, may include a birefringent film having two different refractive indices when measured in two orthogonal directions. These spatially different optical properties result in a "fast axis" and a "slow axis" along which light can be transmitted through the film. Light that is polarized along the fast axis experiences a lower refractive index and travels faster than the material than light polarized along the slow axis, which has the higher refractive index. When this quarterwave retarder is oriented so that the fast axis is at a 45° angle to the transmission axis of a linear polarizer that precedes it in the light path, half of the incident light travels along the fast axis, and half the light travels along the slow axis. The net result is that the phase of the light that travels along the slow axis is shifted by 90 degrees, or a ¼ of a wavelength out of phase, for a specific thickness of the quarter wave retarder. In some examples, one or both of receiving polarizer 24 or source polarizer 26 may include one or more of absorptive polarizers, beam-splitting polarizers, birefringent polarizers, Fresnel reflective polarizers, thin-film polarizers, wire-grid polarizers, reflective polarizers, or quarter-wave polarizers. The polarizers may be formed as films, coatings, plates, or cuboids. Different source polarizers can be used to generate different kinds of polarization states.

Figure 2A:
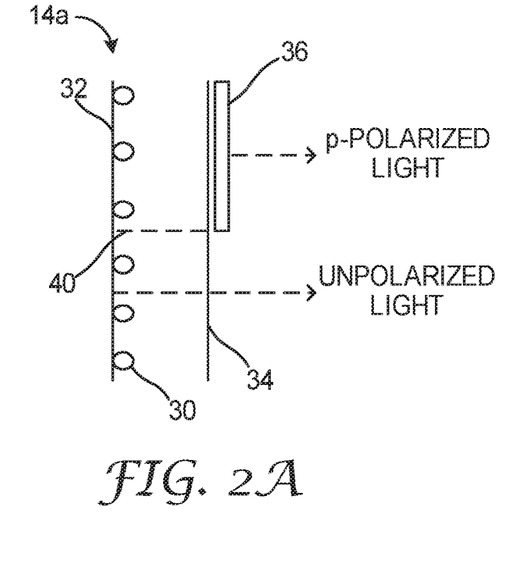
FIG. 2A is a conceptual and schematic diagram of an example polarized light source emitting unpolarized and p-polarized light.

For example, FIGS. 2A to 2D are conceptual and schematic diagrams of example polarized light sources. FIG. 2A is a conceptual and schematic diagram of an example polarized light source 14a emitting unpolarized and p-polarized light. Polarized light source 14a includes one or more light emitting elements 30 (for example, light-emitting diodes, LEDs) on a substrate 32. In some examples, substrate 32 may be a reflective substrate, so that substantially any light incident, scattered, diffused, or otherwise directed towards substrate 32 is reflected back towards a front face 34 of polarized light source 14a. Front face 34 may be defined by a substantially transparent or translucent optical medium, for example, glass or plastic, and may include one or more filters or coatings to modify one or more optical characteristics (for example, wavelength or intensity) of light passing through front face 34. Thus, a portion of light emitted by light emitting elements 30 may be unpolarized light, as shown in FIG. 2A. In some examples, polarized light source 14a includes a polarization modifier, for example, a retarder. In some examples, polarized light source 14a includes a quarter-wave retarder 36. Quarter-wave retarder 36 may be adjacent light emitting elements 30, for example, between front face 34 and light emitting elements 30, or such that front face 34 is between light emitting elements and quarter-wave retarder 36. In some examples, quarter-wave retarder 36 only allows p-polarized light to pass, as shown in FIG. 2A. Thus, polarized light source 14a may emit an unpolarized light beam and a p-polarized light beam. In some examples, polarized light source 14a includes an optical barrier 40. Optical barrier 40 may be a reflective or absorbing barrier that may maintain separation between the unpolarized and polarized light emitted by polarized light source 14a by preventing cross-over of unpolarized and polarized light emitted by adjacent portions of polarized light source 14a.

Figure 2B:
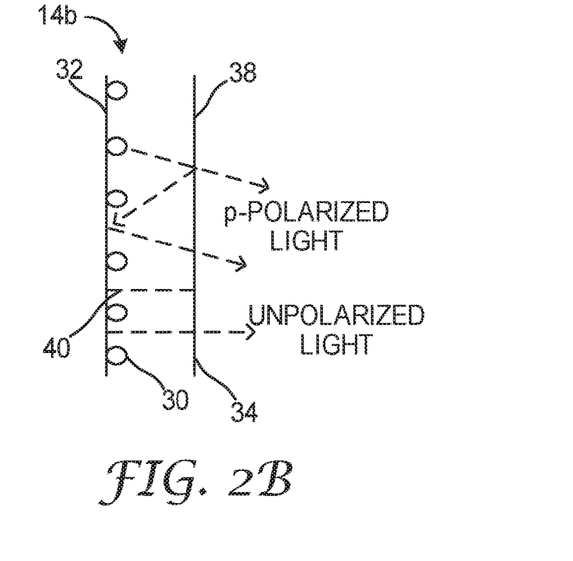
FIG. 2B is a conceptual and schematic diagram of an example polarized light source emitting p-polarized light.

FIG. 2B is a conceptual and schematic diagram of an example polarized light source 14b emitting p-polarized light. Polarized light source 14b includes a reflective polarizer 38 that only transmits light having a particular polarization, for example, p-polarization, and reflects all other light components. Thus, successive reflection between substrate 32 and reflective polarizer 38 eventually results in transmission of a relatively high intensity of p-polarized light. Similar to polarized light source 14a, polarized light source 14b may optionally include optical barrier 40 and front face 34 to permit emission of an unpolarized light beam, in addition to a p-polarized light beam.

Figure 2C:
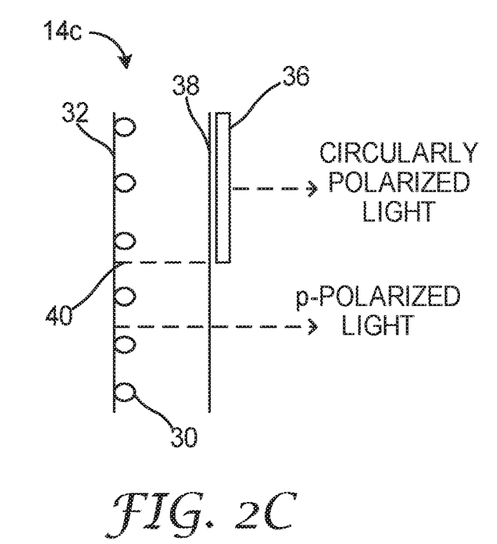
FIG. 2C is a conceptual and schematic diagram of an example polarized light source emitting p-polarized light and circularly polarized light.

FIG. 2C is a conceptual and schematic diagram of an example polarized light source 14c emitting p-polarized light and circularly polarized light. Similar to polarized light source 14b, polarized light source 14c includes reflective polarizer 38 that only transmits light having a particular polarization, for example, p-polarization. Polarized light source 14c also includes quarter-wave retarder 36 adjacent at least a portion of reflective polarizer 38. In combination, quarter-wave retarder 36 and reflective polarizer 38 transmit circularly polarized light.

Figure 2D:
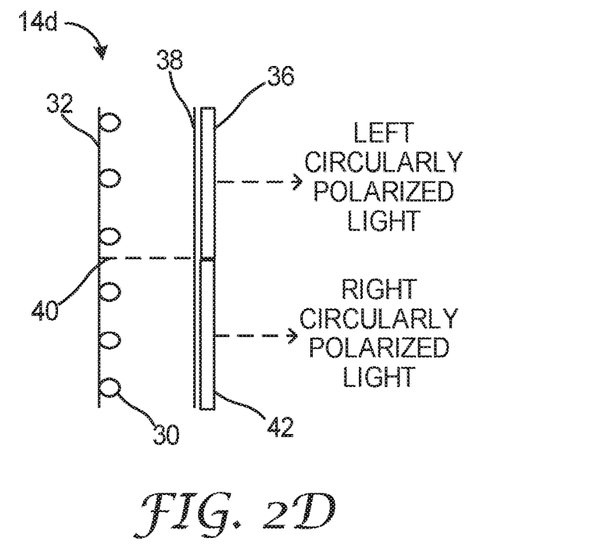
FIG. 2D is a conceptual and schematic diagram of an example polarized light source emitting left- and right-circularly polarized light.

FIG. 2D is a conceptual and schematic diagram of an example polarized light source 14d emitting left- and right-circularly polarized light. Similar to polarized light source 14c, polarized light source 14d also includes quarter-wave retarder 36 adjacent at least a portion of reflective polarizer 38. Polarized light source 14d includes a second quarter-wave retarder 42 that has a fast axis orthogonal to that of quarter-wave retarder 36. Thus, the handedness of circularly polarized light emitted by the combination of quarter-wave retarder 36 and reflective polarizer 38 is opposite the handedness of circularly polarized light emitted by the combination of quarter-wave retarder 36 and second reflective polarizer 42. For example, one emits right-circularly polarized light while the other emits left-circularly polarized light, as shown in FIG. 2D. One or more of the source polarization schemes described with reference to FIGS. 2A to 2D may be combined, to provide a universal polarized light source capable of generating light of any predetermined polarization.

Figure 3:
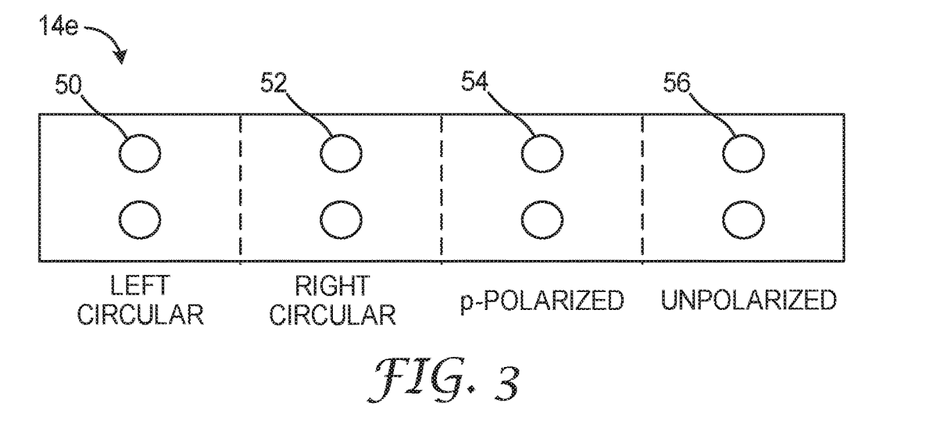
FIG. 3 is a conceptual and schematic diagram of an example polarized light source for emitting one or more of unpolarized, p-polarized, right-circularly polarized, and left-circularly polarized light.

For example, FIG. 3 is a conceptual and schematic diagram of an example polarized light source 14e for emitting one or more of unpolarized, p-polarized, right-circularly polarized, and left-circularly polarized light. Polarized light source 14e includes one or more of at least one left-circular polarized light source 50, at least one right-circular polarized light source 52, at least one linear polarized (for example, p-polarized) light source 54, and an unpolarized light source 56. Each of at least one left-circular polarized light source 50, at least one right-circular polarized light source 52, at least one linear polarized light source 54, or at least one unpolarized light source 56 may include one or more light emitting elements and respective source polarizers. In some examples, different source polarizers may be disposed adjacent a unitary light element or light element array such that different source polarizers polarize different portions of light to generate different light beams.

Thus, system 10 may include one or more polarized light sources to emit light having one or more of unpolarized or predetermined polarized components. Light receiving unit 12 may also include one or more sub-units or sensors configured to receive and sense one or more of unpolarized or predetermined polarized components.

Figure 4:
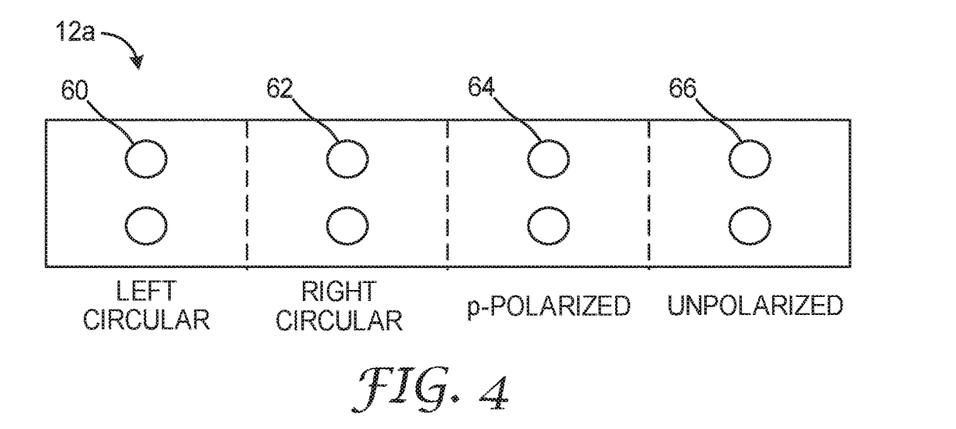
FIG. 4 is a conceptual and schematic diagram of an example light receiving unit for detecting one or more of unpolarized, p-polarized, right-circularly polarized, and left-circularly polarized light.

For example, FIG. 4 is a conceptual and schematic diagram of an example light receiving unit 12*a* for detecting one or more of unpolarized, p-polarized, right-circularly polarized, and left-circularly polarized light. Light receiving unit 12*a* includes one or more of at least one left-circular polarized light receiver 60, at least one right-circular polarized light receiver 62, at least one linear polarized (for example, p-polarized) light receiver 64, and an unpolarized light receiver 66. Each of at least one left-circular polarized light receiver 60, at least one right-circular polarized light receiver 62, at least one linear polarized light receiver 64, or at least one unpolarized light receiver 66 may include one or more sensors and respective receiving polarizers. In some examples, different receiving polarizers may be disposed adjacent a unitary sensor array such that different sensor elements of the sensor array receive light passing through the respective polarizers. The respective sensor elements may generate respective signals indicative of the presence of respective linear or circular polarized or unpolarized components.

In some examples, light receiving units according to the disclosure may include angle-selective components to act as a directional filter to shield the light receiving unit from unwanted light. For example, angle-selective components may include louvered structures, wavelength shifting interference films, and microreplicated structures. Further, light receiving units according to the disclosure may include spatially variant sensor pixels that detect different polarization states and overlapping fields of view. Two or more images could be captured and compared to determine polarization state and variation thereof over time. In some examples, systems according to the disclosure may include one or both of multi-polarization light sources or receivers.

Figure 5:
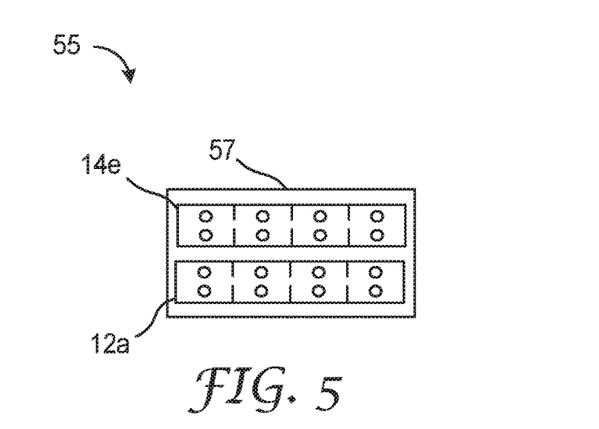
FIG. 5 is a conceptual and schematic diagram of an assembly including at least one light receiving unit and at least one polarized light source.

FIG. 5 is a conceptual and schematic diagram of an assembly 55 including at least one light receiving unit 12*a* and at least one polarized light source 14*e*. Assembly 55 may include, instead of, or in addition to, light receiving unit 12*a* or polarized light source 14*e*, any suitable light receiving unit or polarized light source according to the disclosure. Thus, assembly 55 may include a polarized light source, and a light receiving unit configured to generate a signal indicative of a received polarization state of light received by the light receiving article. In some examples, polarized light source 14*e* is oriented to emit polarized light along a predetermined path, for example, towards light directing article 16. In some examples, polarized light source 14*e* (or other polarized light sources according to the disclosure) may be movable or redirectable to emit incident light 20 along a predetermined path. For example, a motor, servo, or other mechanism may be used to orient or steer polarized light source 14*e*. In some examples, a lidar unit may be capable of steering an output beam towards a predetermined point or direction in a field of view. The light may be a substantially linear or piecewise linear path. In some such examples, light receiving unit 12*a* may be oriented to receive light substantially within a predetermined light cone about the predetermined path or along a direction substantially parallel to the predetermined path. For example, light receiving unit 12*a* may be oriented to receive light emitted by polarized light source 14*e* towards light directing article 16 and deflected towards light receiving unit substantially along the same path, or within a predetermined cylindrical or conical zone about the path.

In some examples, assembly 55 may include a housing 57. Housing 57 may be defined by one or more of metal, glass, plastic, composite, or any suitable structural material. In some examples, light receiving unit 12*a* and polarized light source 14*e* may be secured or mounted within housing. 57, for example, adjacent to each other. Light receiving unit 12*a* and polarized light source 14*e* may be removably or replaceably secured or mounted within housing 57 so that one or both of light receiving unit 12*a* or polarized light source 14*e* may be retrieved from housing 57 for maintenance, repair, or upgrades.

In some examples, assembly 55 may include a controller 28. For example, controller 28 may be secured or mounting within housing 57. In other examples, controller 28 may be external to housing 57, and be coupled to one or both of light receiving unit 12*a* or polarized light source 14*e* by a wireless or wired connecting for sending and receiving signals.

Referring back to FIG. 1, in some examples, system 10 includes a controller 28 in communication with light receiving unit 12 to analyze polarization states or patterns in deflected light 22. Controller 28 may include at least one processor, storage space for storing instructions for the processor, and for storing data, for example, lookup tables or known patterns, and data regarding sensed polarization states or patterns. In some examples, controller 28 receives the signal generated by light receiving unit 12. Controller 28 is configured to determine a received polarization state of deflected light 22 based on the signal received from light receiving unit 12. For example, a first signal may be indicative of a presence of a predetermined polarization state, and a second signal may be indicative of the absence of the predetermined polarization state. Controller 28 may also determine the identity or location of light receiving unit 12, or a sensing element thereof, to determine a relative spatial location associated with the signal. For example, controller 28 may determine that the signal is associated with light deflected from the top, bottom, sides, center, or a particular co-ordinate location of a predetermined co-ordinate signal of a pattern element or block along light directing article 16.

In some examples, controller 28 may also be in communication with polarized light source 14. For example, controller 28 may be configured to send a control signal to polarized light source 14. In such examples, polarized light source 14 may be configured to transmit light 20 having a source polarization state or pattern based on the control signal. One or both of the received polarization state or the source polarization state may be a linear polarization or a circular polarization. Further, controller 28 may control spatial or temporal patterns of polarization states of incident light 20, and may compare such patterns with those of the spatial or temporal pattern of polarization states of deflected light 20, to determine and generate a response signal.

In some examples, controller 28 is configured to generate a response signal based on the signal received from light receiving unit 12. For example, controller 28 may be configured to generate the response signal based on a comparison of the received polarization state with a predetermined polarization state. In some examples, controller 28 is configured to generate the response signal based on a relative location of the polarization change feature along the light directing article.

In some examples, controller 28 may control one or both of light receiving unit 12 or polarized light source 14 such that illumination of light directing article 16 by incident light 20 and its surroundings or luminance of light 22 deflected by light directing article 16 and its surroundings may be provided with two or more temporally- and/or spatially- and/or wavelength-dependent polarization states to provide a signal that will be machine-readable (while being visually imperceptible) to blink or flash at a predetermined frequency and/or pattern. In some examples, controller 28 may implement a fast Fourier transform (FFT) module or another suitable signal processing algorithm to resolve spatial and temporal features from one or more signals received from light receiving unit 12. For example, controller 28 may extract one or more pixels that are blinking, pixels that do not blink, and edge and other geometric features of light directing article 16 and deflected light 22.

In addition to one or both of light receiving unit 12 or polarized light source 14, controller 28 may optionally send signals to or receive signals from other components such as visible light cameras, radar, global positioning system (GPS), or acoustic sensors. Controller 28 may use such signals in addition to the signal received from light directing article 16 to generate the response signal.

Thus, in some examples, controller 28 may interrogate light directing article 16 with a predetermined polarization pattern in incident light 20 and detect the response pattern of light directing article 16 to the interrogation pattern. Based on the response pattern, controller 28 may send a response signal to a vehicle. In some examples, a vehicle may receive the response signal from controller 28 and perform a predetermined vehicle action in response to the response signal.

Figure 6:
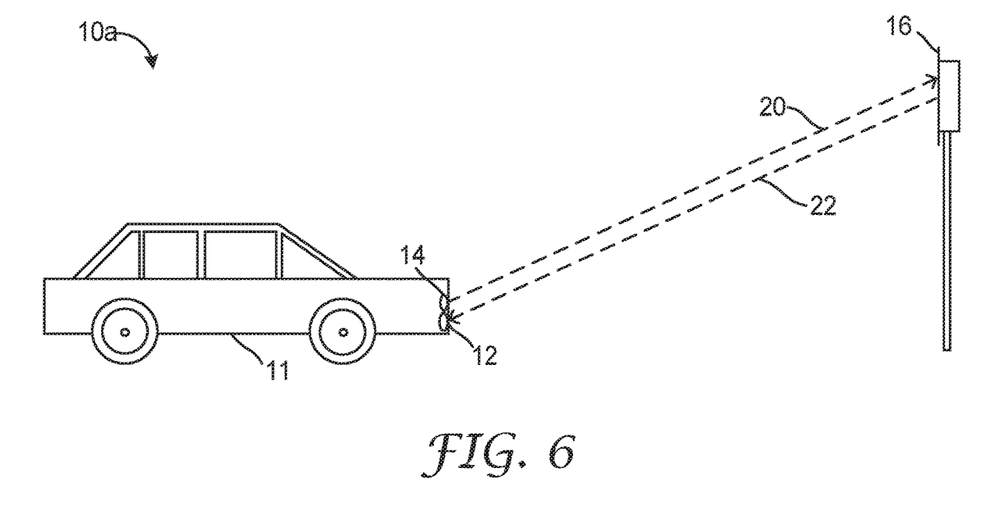
FIG. 6 is a conceptual and schematic view of an example system including a light directing article, and a vehicle including a light receiving unit and a polarized light source.

For example, FIG. 6 is a conceptual and schematic view of an example system 10a including light directing article 16, and a vehicle 11 including light receiving unit 12 and polarized light source 14. In some examples, vehicle 11 may include an assembly including a light receiving unit and a polarized light source, for example, assembly 55. Light receiving unit 12 may be coupled to vehicle 11. For example, light receiving unit 12 may be removably or permanently mounted or secured to vehicle 11, or a component, for example, mounting bracket, on or in vehicle 11. In some examples, polarized light source 14 may also be coupled to vehicle 11, as shown in FIG. 6. The presence of a particular polarization state in deflected light 22 may be indicative of a traffic sign, or a recommended or required action, for example, a yield sign, or a stop sign, or a proximity of an upcoming light signal post or cross-walk. The predetermined vehicle action may include one or more of, for example, progressive deceleration, slowing, and stopping, of vehicle 11. Thus, based on the polarization state of deflected light 22, vehicle 11 may perform one or more predetermined vehicle actions, for example, predetermined maneuvers, safety actions, or signaling an occupant to assume manual control of vehicle 11. In some examples, example system 10a may not include polarized light source 14 or light directing article 16, and light receiving unit 12 may receive light emitted by another system, for example, another vehicle.

While in the example shown in FIG. 6, vehicle 11 includes polarized light source 14, in other examples, polarized light source 14 may be an external source separated from or remote from vehicle 11. For example, polarized light source 14 may be installed near or otherwise directed towards light directing article 16, such that light directing article 16 deflects incident light 20 from polarized light source 14 as deflected light 22 towards oncoming vehicle 11. In some examples, no polarized light source 14 may be present, and ambient light, solar light, or light from other sources having polarized components may be deflected by light directing article 16 towards light receiving unit 12 or otherwise detected and sensed by light receiving unit 12.

Figure 7:
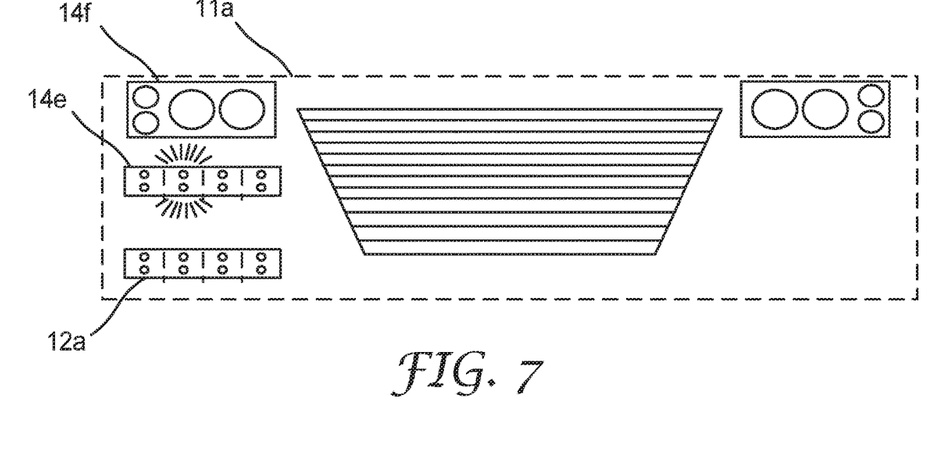
FIG. 7 is a conceptual and schematic partial front view of a vehicle including a polarized light source and a light receiving unit.

FIG. 7 is a conceptual and schematic partial front view of a vehicle 11a including light receiving unit 12a and polarized light source 14e. In some examples, vehicle 11a may include assembly 55 including light receiving unit 12a and polarized light source 14e. One or more of respective sources of polarized light source 14e may be activated to emit light having a predetermined polarization state. In some examples, instead of, or in addition to, using a dedicated polarized light source 14e, one or more polarizing filters or elements may be disposed adjacent headlights, tail-lights, or other lights of vehicle 11, to form polarized light source 14f. While light receiving unit 12a and polarized light source 14e are adjacent in the example shown in FIG. 7, in other examples, light receiving unit 12a and polarized light source 14e may be relatively remote from each other. For example, one of light receiving unit 12a or polarized light source 14e may be disposed near the top or driver side of vehicle 11, while the other of light receiving unit 12a or polarized light source 14e may be disposed near the bottom or the passenger side of vehicle 11. In some examples, the separation between light receiving unit 12a or polarized light source 14e may be within a predetermined spacing to send and receive light within a predetermined angular deflection defined by light directing article 16.

Thus, example systems according to the disclosure include a light receiving unit for sensing a polarization state or pattern of light received by the light receiving unit. In some examples, example systems according to the disclosure may also further include one or more of a polarized light source, a light directing article, and a controller.

Figure 8:
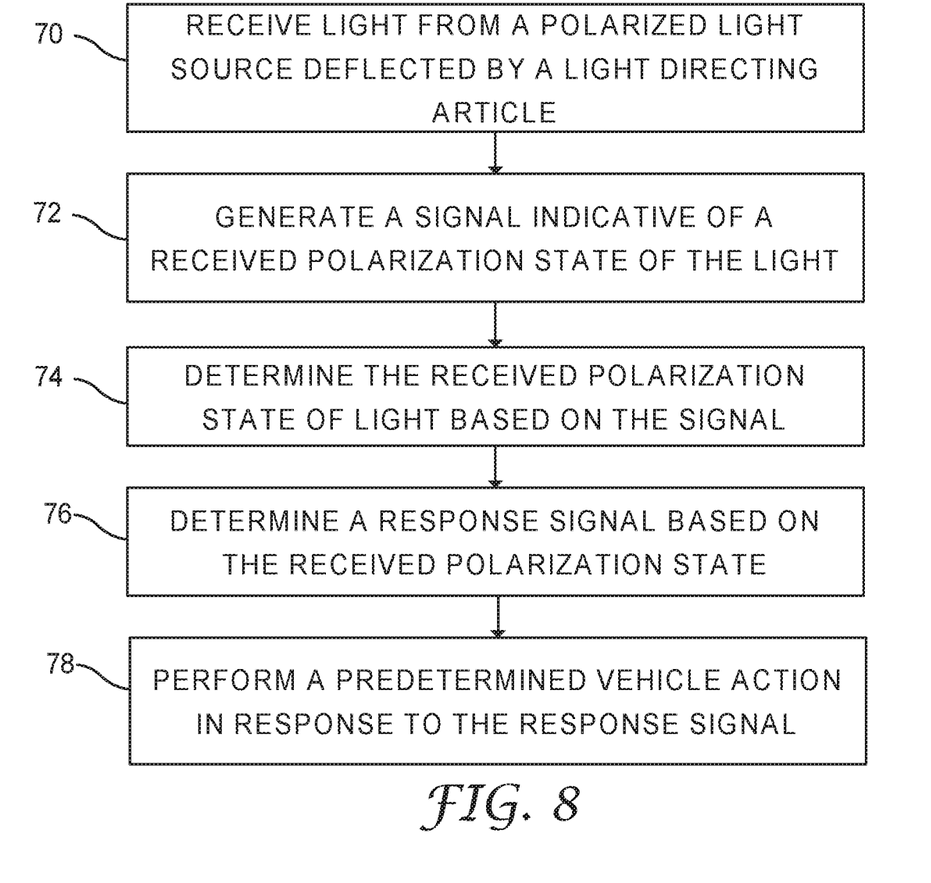
FIG. 8 is a flowchart of an example technique for detecting a polarization state of light received by a light receiving unit.

FIG. 8 is a flowchart of an example technique for detecting a polarization state of light received by light receiving unit 12. The example technique of FIG. 8 is described with reference to example systems, articles, assemblies, and components described with FIGS. 1 to 7. However, example techniques according to the disclosure may be implemented using any suitable system, articles, or components.

In some examples, the example technique of FIG. 8 includes receiving, by light receiving unit 14, light from polarized light source 14 deflected by light directing article 16 (70). The receiving (70) may include transmission of deflected light 22 through receiving polarizer 24 to sensor 13 of light receiving unit 12.

In some examples, the example technique of FIG. 8 includes generating, by light receiving unit 16, a signal indicative of a received polarization state of light 22 deflected by light directing article 16 (72). For example, sensor 13 may generate the signal. In examples in which sensor 13 includes an array of sensing elements, a first characteristic of the signal may be indicative of an identity of a particular sensing element of the array of sensing elements, and a second characteristic of the signal may be indicative of the polarization state. For example, the first or second characteristic may include a polarity, voltage, current, average frequency, frequency peaks, or any other suitable characteristic.

In some examples, the example technique of FIG. 8 further includes receiving, by controller 28, the signal generated by light receiving unit 16, and determining, by controller 28, the received polarization state of light 22 based on the signal (74). For example, controller 28 may receive the signal by a wired or wireless connection from sensor 13 or otherwise from light receiving unit 12. Controller 28 may compare the signal to known values or ranges of signals, for example, a lookup table, or a database, and determine a polarization state associated with the signal.

Instead of a single signal, controller 28 may receive and analyze a plurality of signals from one or more sensors or light receiving units.

In some examples, the example technique of FIG. 8 further includes generating, by controller 28, a response signal based on the received polarization state or pattern (76). For example, the generating (76) includes comparing the received polarization state or pattern with a predetermined polarization state or pattern. The state or pattern may include a static polarization state, or a dynamic change in polarization state, or some spatial or temporal variation in polarization state. In some examples, the generating (76) includes determining a relative location of a polarization change feature along the light directing article.

In some examples, the example technique may include, by controller 28, sending of the response signal to vehicle 11. For example, the example technique of FIG. 8 may further include by vehicle 11, performing a predetermined vehicle action in response to the response signal. In some examples, controller 28 may itself control one or more components of vehicle 11, for example, one or more of steering systems, braking systems, or drivetrain, to cause vehicle 11 to perform the predetermined vehicle action.

Figure 9:
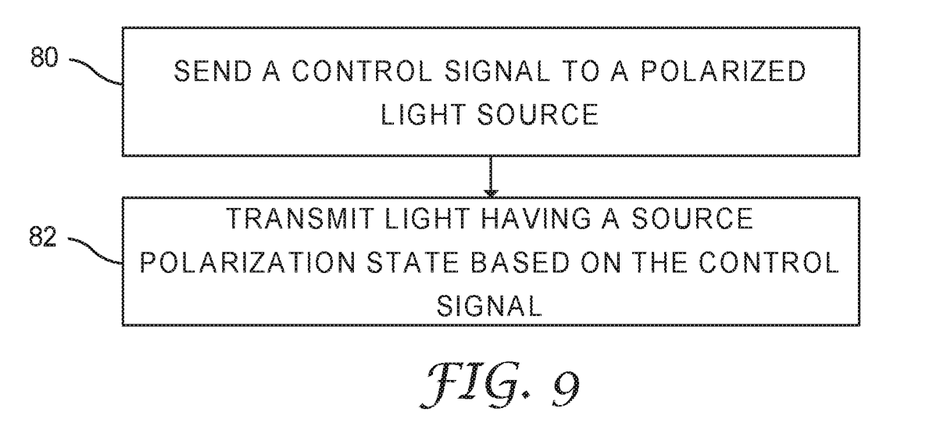
FIG. 9 is a flowchart of an example technique for generating light having a predetermined polarization state.

In some examples, example techniques according to the disclosure include generating light having a predetermined polarization state, for example, to interrogate light directing article 16, and to prompt a response from light directing article 16. For example, FIG. 9 is a flowchart of an example technique for generating light having a predetermined polarization state. The technique of FIG. 9 includes sending, by controller 28, a control signal to polarized light source 14. In some examples, the example technique of FIG. 9 includes transmitting, by polarized light source 14, light 20 having a predetermined source polarization state based on the control signal towards light directing article 16 (82).

The example technique of FIG. 9 may be implemented before, during, recurring, simultaneously, intermittently, or interleaved with, the technique of FIG. 8. For example, light source 14 may emit polarized light 20 having a first characteristic, and light directing article 16 may deflect or return deflected light 22 having the same or a modified polarization characteristic. A number of combinations of sent and received polarization states in incident light 20 and deflected light 22 could be implemented by controller 28. For example, polarized light source 14 may emit light 20 that may be linearly polarized (for example, vertically polarized), left-circularly polarized, or right-circularly polarized. Light directing article 16 may interact with incident light 20 to generate deflected light 22 having one of linearly polarized light (vertically polarized, or linear 90 degrees to the vertical), left-circularly polarized, or right-circularly polarized, or depolarized light. In some examples, light directing article 16 may substantially absorb light 20 and not deflect any light 22 towards light receiving unit 12.

Some example configurations may be particularly useful. As shown in TABLE 1, polarized light source 14 could emit different polarization states such as horizontal linearly polarized light (denoted as Linear H), vertical linear polarized light (denoted as Linear V), left circularly polarized light (LCP or Left CP), or right circularly polarized light (RCP or Right CP) as indicated on the left hand side of the table. Light directing article 16 can be designed to return different polarization states to a transceiver which include Linear H, Linear V, Left CP, and Right CP. The state of light that is returned to the transceiver depends on the properties of the retarder as indicated in the cells of the table. For example, if Linear H light is incident on a retroreflector having a ¼ wave retarder, the retroreflector will rotate the polarization of the light 90 degrees and return Linear V. Another example is if Left CP light is incident on a retroreflector having ¼ wave retarder, the retroreflector will return Left CP light. Another example is if Linear H light is incident on a retroreflector having an $\frac{1}{8}^{th}$ wave retarder, the retroreflector will return Left CP light. Conversely to have incident Linear H light and have the retroreflector return Right CP light, the retarder should be $\frac{3}{8}^{th}$ th wave. TABLE 1 includes that case of the retarder slow axis at 45 degrees from vertical.

TABLE 1

| | | Deflected light | | | |
|---|---|---|---|---|---|
| | | Linear H | Linear V | Left CP | Right CP |
| Incident Light | Linear H | isotropic | ¼ wave | ⅛ wave | ⅜ wave |
| | Linear V | ¼ wave | isotropic | ⅜ wave | ⅛ wave |
| | Left CP | ⅛ wave | $\frac{3}{8}^{th}$ wave | ¼ wave | isotropic |
| | Right CP | ⅜ wave | ⅛ wave | isotropic | ¼ wave |

If the retarder slow axis is −45 degrees from vertical, some of the retarder requirements change as indicated in TABLE 2.

TABLE 2

| | | Deflected light | | | |
|---|---|---|---|---|---|
| | | Linear H | Linear V | Left CP | Right CP |
| Incident Light | Linear H | isotropic | ¼ wave | ⅜ wave | ⅛ wave |
| | Linear V | ¼ wave | isotropic | ⅛ wave | ⅜ wave |
| | Left CP | ⅜ wave | ⅛ wave | ¼ wave | isotropic |
| | Right CP | ⅛ wave | ⅜ wave | isotropic | ¼ wave |

Though not intended to be limiting, this shows that retardation levels of ⅛, ¼, and ⅜ may be particularly useful if the objective is to utilize circularly polarized light in the emission from polarized light source 14 and/or the return of light from light directing article 16 to light receiving unit 12.

Further, the polarization states may be associated with one particular wavelength or wavelength band, or with more than one wavelength or wavelength band. For example, polarized light source 14 may emit one or two wavelengths designated as $\lambda_1$ or both $\lambda_1$ and $\lambda_2$. The light directing article 16 may only deflect (for example, retroreflect) light that was sent to it. If light directing article 16 only receives $\lambda_1$ in incident light 20 then it may only return $\lambda_1$ in deflected light 22. If light directing article 16 receives both $\lambda_1$ and $\lambda_2$, then light directing article 16 may act on and return both wavelengths or wavelength bands. Additional wavelengths $\lambda_3$, $\lambda_4$ and so on may also be used. The wavelengths or wavelength bands can be in the visible, near, or mid-infrared.

Thus, example systems, articles, and techniques according to the present disclosure may allow detection of traffic objects and events, and facilitate semi- or fully-automated vehicle navigation or control.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Example articles and techniques according to the disclosure provide will be illustrated by the following non-limiting examples.

EXAMPLES

Example 1

Figure 10A:
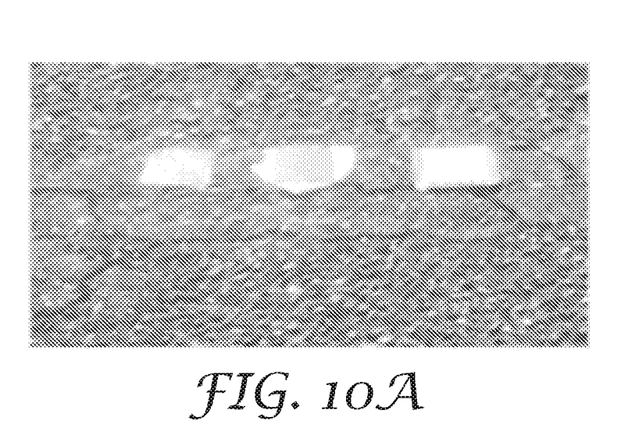
FIGS. 10A, 10B, and 10C are photographs representing successive reduction in glare from asphalt by using polarized light.
Figure 10B:
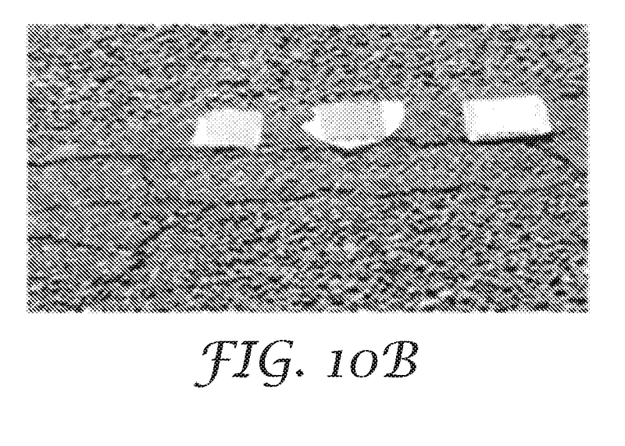
Figure 10C:
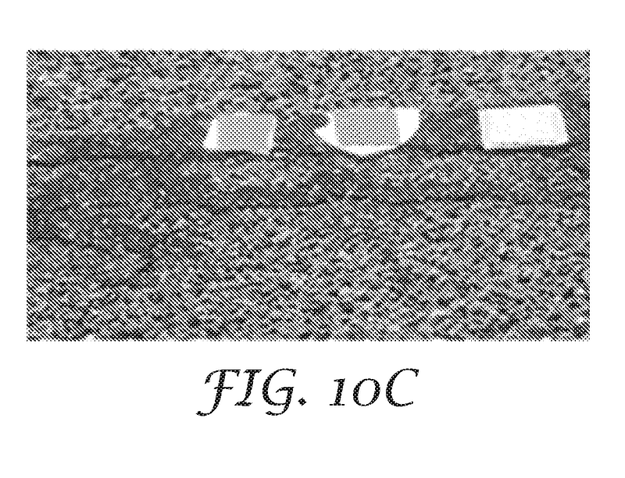

The elimination or reduction of roadway (and retroreflector surface) glare for improved detection was evaluated. FIGS. 10A, 10B, and 9C are photographs representing successive reduction in glare from asphalt by using polarized light. In FIGS. 10A, 10B, and 10C, the early morning sun was opposite angle of the camera to the pavement. FIG. 10A shows a photograph taken with no polarizer over the detector. FIG. 10B shows a polarizer having horizontal pass axis (s-pol) over the detector. FIG. 10C was taken with vertical pass (p-pol) polarizer over the detector and shows a significant reduction in both roadway glare and surface glare of the retroreflector as indicated by the saturated yellow color. No retroreflection was conducted, only observation of sun glare. However, as a prophetic variation of the example, adding a p-polarized light source would improve visibility at dusk and dawn, and depending on the brightness, possibly during daylight conditions.

Example 2

Figure 11A:
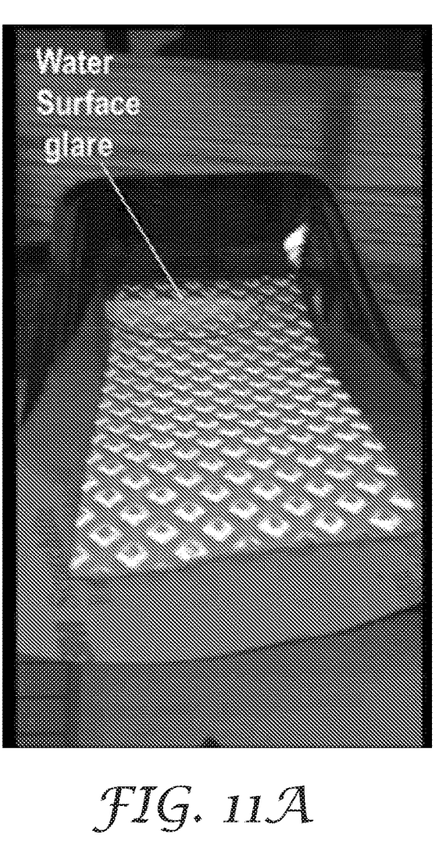
FIGS. 11A and 11B are photographs representing reduction in water surface glare from pavement markings by using polarized light.
Figure 11B:
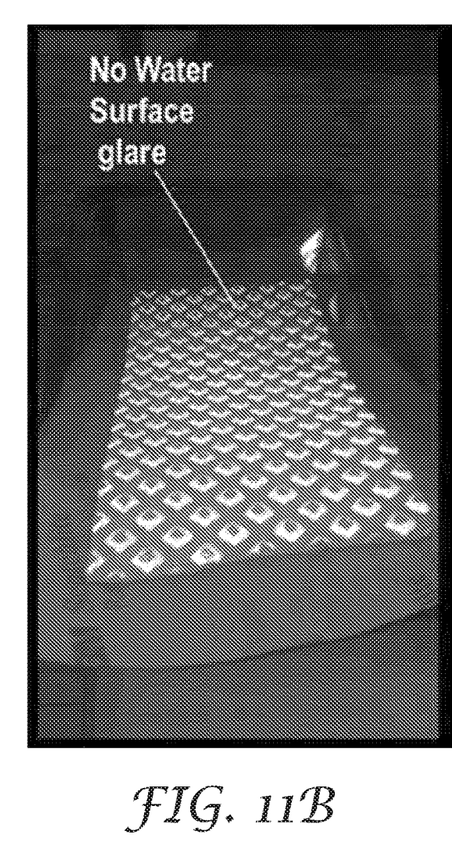

Using polarization to improve the detection of wet pavement markings was evaluated. FIGS. 11A and 11B are photographs representing reduction in water surface glare from pavement markings by using polarized light. Water on the surface of pavement markings can cause poor detectability due to several reasons. First, glare from other light sources such as the sun or an oncoming car is efficiently reflected from the water surface as s-pol light. Secondly, the light from the vehicle headlights is inefficient at reaching the retroreflector since much of the incident beam is specularly reflected away from the water surface and never encounters the retroreflector. FIGS. 11A and 11B show that such problems can be solved by emitting p-polarized light from a light source, using a polarization preserving retroreflective pavement marking, and using a p-polarized polarizer (i.e. aligned to that of the source) on a light receiving unit. Without being bound by theory, p-polarized light efficiently makes it to the retroreflector, the retroreflector preserves that polarization and sends it back to the detector, and the detector receives p-polarized light, while blocking the s-pol from an oncoming car.

Example 3

Figure 12A:
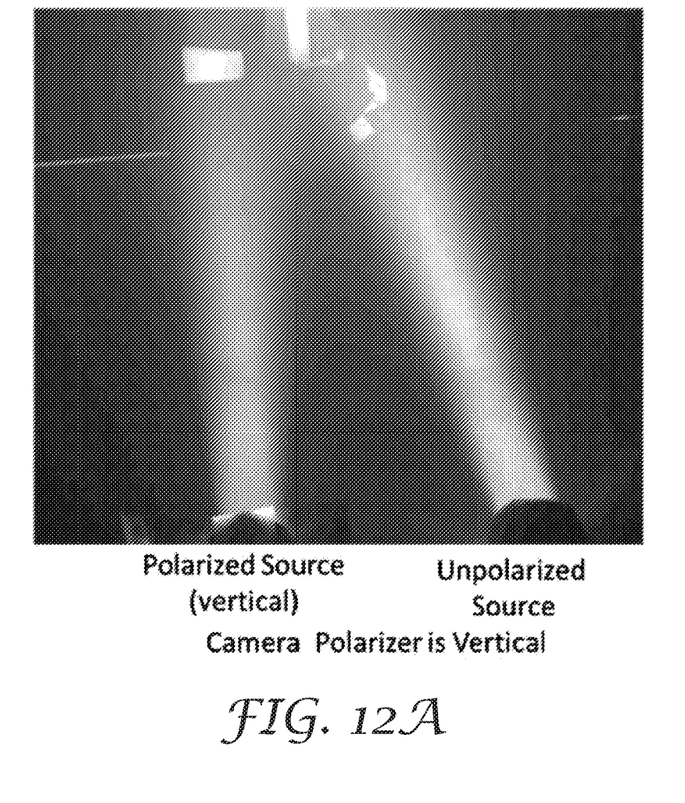
FIGS. 12A and 12B are photographs representing enhancement in through-fog visibility using polarized light.
Figure 12B:
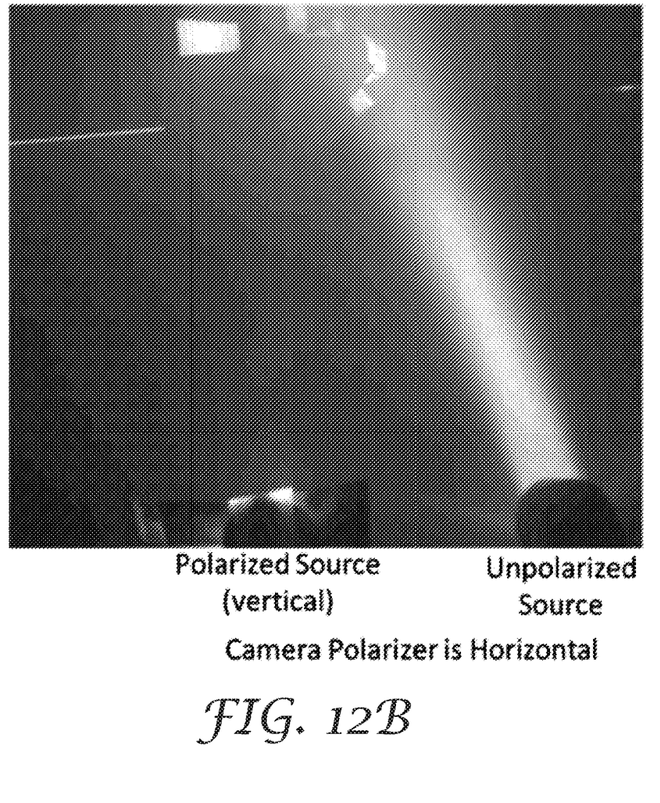

The use of polarized light to improve signal to noise in foggy environments was evaluated. FIGS. 12A and 12B are photographs representing enhancement in through-fog visibility using polarized light. Fog preserves linearly polarized light in reflection. Scotchlite Diamond Grade (3M Company, Saint Paul, Minn.) retroreflector depolarizes. FIG. 12A shows two light sources and retroreflectors in the distance. The left light source had a linear polarizer, the right source is unpolarized. The camera taking the picture had a linear polarizer which is aligned with that of the left light source. The room was filled with fog, and the backscatter was clearly observable.

In FIG. 12B, the camera polarizer was rotated to be orthogonal to that of the polarized light source. The beam of the left light source disappeared, while the beam of the unpolarized light source was still visible. The retroreflector was visible in the distance. Without being bound by theory, a depolarizing retroreflector retroreflects depolarized light, and the polarization component of that light that is aligned with the camera polarizer pass axis was detected in the image.

Various examples of the invention have been described. These and other examples are within the scope of the following claims.

The following are exemplary embodiment according to the present disclosure:

Item 1. A system comprising:
a light receiving unit comprising a sensor and a receiving polarizer, wherein the sensor is configured to sense light from a polarized light source deflected through the receiving polarizer by a light directing article, and wherein the sensor is configured to generate a signal indicative of a received polarization state of the light deflected by the light directing article.

Item 2. The system of item 1, wherein the light directing article is configured to change polarization of light emitted by the polarized light source.

Item 3. The system of items 1 or 2, further comprising the polarized light source.

Item 4. The system of any one of items 1 to 3, wherein the polarized light source comprises a diffuse light source and a source polarizer.

Item 5. The system of item 4, wherein the polarized light source comprises a reflective polarizer.

Item 6. The system of item 4, wherein the source polarizer comprises a linear polarizer or a circular polarizer.

Item 7. The system of item 3, wherein the receiving polarizer comprises a linear polarizer or a circular polarizer.

Item 8. The system of any one of items 1 to 7, wherein the light receiving unit comprises a camera.

Item 9. The system of any one of items 1 to 8, further comprising the light directing article.

Item 10. The system of item 9, wherein the light directing article comprises at least one polarization change feature configured to change polarization of light incident on the light directing article into a different polarization state of deflected light.

Item 11. The system of item 10, wherein the at least one polarization change feature comprises a plurality of polarization change features arranged in a predetermined spatial pattern on the light directing article configured to change polarization of incident light into a plurality of predetermined different polarization states of reflected light, each polarization state of the predetermined different polarization states being associated with a relative location of a polarization change feature of the plurality of polarization change features along the light directing article.

Item 12. The system of any one of items 9 to 11, wherein the light directing article comprises a retroreflective article.

Item 13. The system of any one of items 1 to 12, further comprising a controller configured to receive the signal generated by the light receiving unit, wherein the controller is configured to determine the received polarization state of light based on the signal.

Item 14. The system of item 13, wherein the controller is configured to generate a response signal based on the received polarization state.

Item 15. The system of item 13, wherein the controller is configured to generate the response signal based on a comparison of the received polarization state with a predetermined polarization state.

Item 16. The system of any one of items 13 to 15, wherein the controller is configured to generate the response signal based on a relative location of the polarization change feature along the light directing article.

Item 17. The system of any one of items 13 to 16, wherein the controller is configured to send a control signal to the polarized light source, wherein the polarized light source is configured to transmit light having a source polarization state based on the control signal.

Item 18. The system of any one of items 13 to 17, wherein one or both of the received polarization state or the source polarization state is a linear polarization or a circular polarization.

Item 19. The system of any one of items 14 to 18, wherein the response signal is configured to cause a vehicle to perform a predetermined vehicular action.

Item 20. The system of item 19, further comprising the vehicle, wherein the light receiving unit is coupled to the vehicle.

Item 21. A method comprising:
receiving, by a light receiving unit, light from a polarized light source deflected by a light directing article; and
generating, by the light receiving unit, a signal indicative of a received polarization state of the light deflected by the light directing article.

Item 22. The method of item 21, further comprising: transmitting, by the polarized light source, light having a predetermined source polarization state towards the light directing article.

Item 23. The method of item 21 or 22, further comprising:
receiving, by a controller, the signal generated by the light receiving unit; and determining, by the controller, the received polarization state of light based on the signal.

Item 24. The method of item 23, further comprising, generating, by the controller, a response signal based on the received polarization state.

Item 25. The method of item 23, wherein the generating, by the controller, the response signal comprises comparing the received polarization state with a predetermined polarization state.

Item 26. The method of any one of items 23 to 25, wherein the generating, by the controller, the response signal comprises determining a relative location of a polarization change feature along the light directing article.

Item 27. The method of any one of items 24 to 26, further comprising, by a vehicle, performing a predetermined vehicle action in response to the response signal.

Item 28. The method of any one of items 24 to 27, further comprising:
sending, by the controller, a control signal to the polarized light source; and
transmitting, by the polarized light source, light having a source polarization state based on the control signal.

Item 29. The method of any one of items 21 to 28, wherein the one or both of the received polarization state or the source polarization state is a linear polarization or a circular polarization.

Item 30. A computer readable storage medium comprising instructions that, when executed, cause at least one processor to:
receive a signal generated by a light receiving unit, wherein the signal is indicative of a received polarization state of light from a polarized light source deflected by a light directing article and received by the light receiving unit;
determine the received polarization state of light based on the signal; and
generating a response signal based on the received polarization state, wherein the response signal is configured to cause a vehicle to perform a predetermined vehicle action in response to the response signal.

Item 31. The computer readable storage medium of item 30, further comprising instructions that, when executed, cause the at least one processor to:
send a control signal to the polarized light source configured to cause the polarized light source to emit light having a source polarization state.

Item 32. An assembly comprising:
a polarized light source; and
a light receiving unit configured to generate a signal indicative of a received polarization state of light received by the light receiving article.

Item 33. The assembly of item 32, wherein the polarized light source is oriented to emit polarized light along a predetermined path, and wherein the light receiving unit is oriented to receive light substantially within a predetermined light cone about the predetermined path or along a direction substantially parallel to the predetermined path.

Item 34. The assembly of items 32 or 33, further comprising a housing, wherein the polarized light source and the light receiving unit secured adjacent to each other in the housing.

Item 35. The assembly of any one of items 32 to 34, wherein the light receiving unit comprises a sensor and a receiving polarizer, wherein the sensor is configured to sense light received by the light receiving unit through the receiving polarizer and generate the signal indicative of the received polarization state.

Item 36. The system of item 35, wherein the receiving polarizer comprises a linear polarizer or a circular polarizer.
Item 37. The assembly of any one of item 32 to 36, wherein the polarized light source comprises a diffuse light source and a source polarizer.
Item 38. The assembly of any one of item 32 to 37, wherein the polarized light source comprises a reflective polarizer.
Item 39. The assembly of items 37 or 38, wherein the source polarizer comprises a linear polarizer or a circular polarizer.
Item 40. The assembly of any one of items 32 to 39, wherein the light receiving unit comprises a camera.
Item 41. The assembly of any one of items 32 to 40, further comprising a controller configured to receive the signal generated by the light receiving unit, wherein the controller is configured to determine the received polarization state of light based on the signal.
Item 42. The assembly of item 41, wherein the controller is configured to generate a response signal based on the received polarization state.
Item 43. The assembly of item 42, wherein the controller is configured to generate the response signal based on a comparison of the received polarization state with a predetermined polarization state.
Item 44. The assembly of any one of items 41 to 43, wherein the controller is configured to send a control signal to the polarized light source, wherein the polarized light source is configured to transmit light having a source polarization state based on the control signal.
Item 45. The assembly of item 44, wherein one or both of the received polarization state or the source polarization state is a linear polarization or a circular polarization.
Item 46. The assembly of any one of items 42 to 45, wherein the response signal is configured to cause a vehicle to perform a predetermined vehicular action.

The invention claimed is:

1. A system comprising:
   a light directing article comprising a plurality of polarization change features arranged in a predetermined spatial pattern on the light directing article and configured to change polarization of incident light into a plurality of predetermined different polarization states of reflected light, each polarization state of the predetermined different polarization states being associated with a relative location of a polarization change feature of the plurality of polarization change features along the light directing article; and
   a light receiving unit comprising a sensor and a receiving polarizer, wherein the sensor is configured to sense light from a polarized light source deflected through the receiving polarizer by the light directing article, and wherein the sensor is configured to generate a signal indicative of a received polarization state of the light deflected by the light directing article.

2. The system of claim 1, wherein the light directing article is configured to change polarization of light emitted by the polarized light source.

3. The system of claim 1, further comprising the polarized light source.

4. The system of claim 1, wherein the polarized light source comprises a diffuse light source and a source polarizer.

5. The system of claim 1, wherein the light directing article comprises a retroreflective article.

6. A method comprising:
   receiving, by a light receiving unit, light from a polarized light source deflected by a light directing article, the light receiving unit comprising a plurality of sensor elements and a plurality of receiving polarizers, each receiving polarizer configured to transmit a predetermined polarization state to a sensor element corresponding to the receiving polarizer, at least two different receiving polarizers transmitting at least two different predetermined polarization states to at least two different corresponding sensor elements; and
   generating, by the light receiving unit, a signal indicative of a received polarization state of the light deflected by the light directing article.

7. The method of claim 6, further comprising:
   transmitting, by the polarized light source, light having a predetermined source polarization state towards the light directing article.

8. An assembly comprising:
   a polarized light source; and
   a light receiving unit comprising a plurality of sensor elements and a plurality of receiving polarizers, each receiving polarizer configured to transmit a predetermined polarization state to a sensor element corresponding to the receiving polarizer, at least two different receiving polarizers transmitting at least two different predetermined polarization states to at least two different corresponding sensor elements, the light receiving unit configured to generate a signal indicative of a received polarization state of light received by the light receiving unit.

9. The assembly of claim 8, wherein the polarized light source is oriented to emit polarized light along a predetermined path, and wherein the light receiving unit is oriented to receive light substantially within a predetermined light cone about the predetermined path or along a direction substantially parallel to the predetermined path.

10. The assembly of claim 8, further comprising a housing, wherein the polarized light source and the light receiving unit secured adjacent to each other in the housing.

11. The assembly of claim 8, wherein the at least two different predetermined polarization states comprise a linear polarization state and a circular polarization state.

12. The method of claim 6, wherein the at least two different predetermined polarization states comprise a linear polarization state and a circular polarization state.

* * * * *